US010871601B2

(12) United States Patent
Bablumyan et al.

(10) Patent No.: US 10,871,601 B2
(45) Date of Patent: Dec. 22, 2020

(54) VOLUME HOLOGRAPHIC OPTICAL ELEMENTS FOR IMAGING WITH REDUCED ABERRATIONS

(71) Applicant: TIPD, LLC, Tucson, AZ (US)

(72) Inventors: Arkady Bablumyan, Escondido, CA (US); Lloyd J. LaComb, Jr., Tucson, AZ (US); Nasser N. Peyghambarian, Tucson, AZ (US)

(73) Assignee: TIPD, LLC, Tucson, AZ (US)

( * ) Notice: Subject to any disclaimer, the term of this patent is extended or adjusted under 35 U.S.C. 154(b) by 511 days.

(21) Appl. No.: 15/720,349

(22) Filed: Sep. 29, 2017

(65) Prior Publication Data

US 2018/0095212 A1   Apr. 5, 2018

Related U.S. Application Data

(60) Provisional application No. 62/403,584, filed on Oct. 3, 2016.

(51) Int. Cl.
*G02B 5/32* (2006.01)
*G02B 27/00* (2006.01)
(Continued)

(52) U.S. Cl.
CPC ........... *G02B 5/32* (2013.01); *G02B 27/0037* (2013.01); *G03H 1/0248* (2013.01);
(Continued)

(58) Field of Classification Search
CPC .... G02B 5/32; G02B 27/0037; G02B 27/005; G02B 27/0056; G03H 1/0248;
(Continued)

(56) References Cited

U.S. PATENT DOCUMENTS 3,807,829 A    4/1974   Close
4,094,577 A    6/1978   Spitz et al.
(Continued)

OTHER PUBLICATIONS

Quintanilla et al (Holographic Imaging lenses. Composite lens with high efficiency, J. Optics, 1990, vol. 21, No. 2, pp. 67-72, hereafter Quintanilla) (Year: 1990).*

(Continued)

*Primary Examiner* — Stephone B Allen
*Assistant Examiner* — Jyotsna V Dabbi
(74) *Attorney, Agent, or Firm* — Schwegman Lundberg & Woessner, P.A.

(57) ABSTRACT

Transmission and reflection mode VHOEs are designed and fabricated for use in imaging and other applications. These VHOE provide high diffraction efficiency with minimal chromatic aberrations and astigmatism across the bandwidth. The lens provides optical power within the bandwidth centered relative to several wavelengths to magnify (focus or collimate) input light and is transparent for the rest of the image spectrum. In transmission mode, two VHOE are fabricated in such a way as to introduce compensating adjustments that minimize the astigmatism and chromatic aberrations introduced by the bandwidth of the input light. Two VHOEs are required to provide an on-axis imaging system to magnify light to form an image and reduce the chromatic aberrations across the bandwidth and reduce the astigmatism while maintaining high diffraction efficiency (DE). In reflection mode, a single VHOE is configured to act as a mirror at the specified wavelength and bandwidth and to magnify light to form an image and, consequently, has minimal level of astigmatism and chromatic aberration.

16 Claims, 9 Drawing Sheets

(51) Int. Cl.
*G03H 1/02* (2006.01)
*G03H 1/04* (2006.01)
*G03H 1/22* (2006.01)
*G03H 1/26* (2006.01)

(52) U.S. Cl.
CPC ......... *G03H 1/0252* (2013.01); *G03H 1/0402* (2013.01); *G03H 2001/0413* (2013.01); *G03H 2001/0415* (2013.01); *G03H 2001/0439* (2013.01); *G03H 2001/2231* (2013.01); *G03H 2001/2234* (2013.01); *G03H 2001/2615* (2013.01)

(58) Field of Classification Search
CPC .. G03H 1/0252; G03H 1/0402; G03H 1/0272; G03H 1/04; G03H 1/0404; G03H 1/0465; G03H 1/26; G03H 2001/0413; G03H 2001/0415; G03H 2001/0439; G03H 2001/2231; G03H 2001/2234; G03H 2001/2615; G03H 2001/026; G03H 2001/0447; G03H 2001/2202; G03H 2001/22; G03H 2001/2605; G03H 2001/261; G03H 2001/264
USPC ......................................... 359/15, 16, 19, 24
See application file for complete search history.

(56) References Cited

U.S. PATENT DOCUMENTS

| | | | |
|---|---|---|---|
| 4,810,047 A | 3/1989 | Pernick | |
| 5,550,779 A * | 8/1996 | Burr | G11B 7/0065 359/15 |
| 6,236,780 B1 | 5/2001 | Wade | |
| 6,243,513 B1 | 6/2001 | Wade | |
| 6,256,122 B1 | 7/2001 | Dahlmani et al. | |
| 6,536,899 B1 | 3/2003 | Fiala | |
| 6,563,612 B1 * | 5/2003 | Aye | G02B 5/0252 359/15 |
| 6,707,608 B1 | 3/2004 | Arieli et al. | |
| 7,177,550 B1 | 2/2007 | Smith | |
| 8,049,963 B2 | 11/2011 | Menon et al. | |
| 8,081,360 B2 | 12/2011 | Yasuda et al. | |
| 2001/0050751 A1 | 12/2001 | Banyai et al. | |
| 2007/0030490 A1 * | 2/2007 | Adibi | G03H 1/26 356/457 |
| 2009/0046333 A1 * | 2/2009 | Peyghambarian | G03H 1/2645 359/7 |

OTHER PUBLICATIONS

Guo et al (Design of a multiplexing grating of color holographic waveguide, Optical Engg, 54(12) 125105 , Dec. 22, 2015, pp. 125105-1 to 125105-9, hereafter Guo) (Year: 2015).*
Bennet et al (Achromatic combinations of hologram optical elements, Applied Optics, vol. 15, No. 2, Feb. 1976, pp. 542-545, hereafter Bennett) (Year: 1976).*
D. H. Close, "Holographic Optical Elements", Optical Engineering, vol. 14, No. 5 pp. 409-419, 1975.
M. Young, "Zone Plates and Their Aberrations", J. Opt. Soc. Am. A vol. 62 No. 8, Aug. 1972, pp. 972-976.
D. L. Dickensheets "Imaging performance of off-axis planar diffractive lenses", vol. 13, No. 9Sep. 1996, J. Opt. Soc. Am. A, pp. 1849-1858.
H. Kogelnik, "Coupled Wave Theory for Thick Hologram Gratings" , Bell System Technical Journal, vol. 48, Issue 9, pp. 2909-2947, Nov. 1969.
J. Choi et al. "Spectral Diffraction Efficiency Characterization of Broadband Diffractive Optical Elements", Sandia National Laboratories, Mar. 2013.
Y. Arieli et al., "Design of a diffractive optical element for wide spectral bandwidth," Opt. Lett. 23, 823-824 (1998).
Y. Arieli et al. "Design of diffractive optical elements for multiple wavelengths," Appl. Opt. 37, 6174-6177 (1998).
S. Ebstein., "Achromatic diffractive optical elements", Proceedings of the SPIE: Diffractive and Holographic Optics Technology II; vol. 2404, Apr. 20, 1995; doi: 10.1117/12.207472.
E. Di Fabrizio et al., "Fabrication of Diffractive Optical Elements by Electron Beam Lithography," (1997), pp. 149-160 In: Martellucci S., Chester A.N. (eds) Diffractive Optics and Optical Microsystems. Springer, Boston, MA.

* cited by examiner

VOLUME HOLOGRAPHIC OPTICAL ELEMENTS FOR IMAGING WITH REDUCED ABERRATIONS

CROSS-REFERENCE TO RELATED APPLICATIONS

This application claims benefit of priority under 35 U.S.C. 119(e) to U.S. Provisional Application No. 62/403,584 entitled "Broadband High Resolution Diffraction Optics" and filed on Oct. 3, 2016, the entire contents of which are incorporated by reference.

BACKGROUND OF THE INVENTION

Field of the Invention

The invention relates to a volume holographic optical element (VHOE) suitable for imaging applications in one or more wavelength bands and the fabrication thereof. The invention recreates holographically, the properties of refractive or reflective optics to produce a lightweight, thin film, lens. The holographic optical elements can be thinner, lighter, and less expensive than the corresponding refractive or reflective optical elements that they replace. The holographic optical elements can be designed to minimize aberrations in the output wavefront while maintaining high diffraction efficiencies to improve the performance of the imaging system.

Description of the Related Art

Holography is the science and practice of making holograms. Typically, a hologram is a recording of the interference pattern created by the interaction of two light fields (typically called the reference and object beams), rather than of an image formed by a lens. The hologram contains both the amplitude and relative phase of the light fields as opposed to a photograph that contains only the intensity of the recorded light field. The developed hologram works as a diffraction grating that when illuminated by the reference beam generates an output beam that contains the exact wavefront of the object beam. The object beam can be light from a physical object or a computer-generated scene. When the reference beam illuminates the hologram the diffracted light reconstructs a full 3D image of the scene with its full parallax. If the wavefront of the object beam is chosen to have a particular geometric property e.g., spherical or cylindrical shape then the hologram will work as a lens e.g., a spherical or cylindrical lens, thus allowing the hologram to function as an optical element that provides optical power for magnification (larger or smaller).

A Holographic Optical Element (HOE) is a thin film optical device that functions as traditional optical component. HOEs can operate in either transmission replacing and enhancing traditional refractive optics such as lenses, or in reflection replacing and enhancing traditional reflective optics such as mirrors, beam splitters and beam combiners. HOEs can also be designed to generate waveforms not available to traditional refractive and reflective optics including: multi-focus lenses, power mirrors with see-through function, etc. HOEs, especially holographic lenses are widely used in the art and become particularly useful in the wavelength range where refractive optics becomes opaque. The examples of such applications are X-ray and deep UV contact-less photolithography.

The underlying physics of the diffraction of light from a hologram is different depending on the thickness of the recording media. A thin hologram is one where the thickness of the recording medium is much less than the spacing of the interference fringes that make up the holographic recording. In a thin hologram, light scatters into multiple orders where each order corresponds to a particular angle. A thick or volume hologram is one where the thickness of the recording medium is greater than the spacing of the fringes of the interference pattern. The recorded hologram is now a three dimensional structure and HOEs recorded in this fashion are often called Volume Holographic Optical Elements or VHOEs. In a thick hologram, light scatters into only one diffraction order. VHOEs can be fabricated using a wide variety of materials including: Dichromated gelatin, photopolymers, and photoemulsions. The scattering of light from VHOE is governed by the Bragg Equation $$2n\Lambda \sin(\theta+\phi)=\lambda \qquad (1)$$

where n is a positive integer, $\lambda$ the wavelength, $\Lambda$ the step of the grating, $\theta$ the angle between the incident beam and the normal and $\phi$ the angle between the normal and the grating vector.

VHOEs are fabricated by interfering the object and reference beams in a recording medium. The object beam contains the desired output waveform that will be created when the VHOE is illuminated by the reference beam. The VHOE can operate in transmission mode where the light enters on one side of the VHOE and exits on the other side with the desired wavefront. In reflection mode, the light enters on one side of the VHOE and exits on the same side.

When used in transmission mode, current embodiments of VHOEs suffer from either low diffraction efficiency (light within the desired bandwidth directed to the desired angle or angles divided by the total light in that bandwidth) or chromatic aberration (where a lens is either unable to bring all wavelengths to a focus in the same focal plane, and/or when wavelengths are focused at different positions in the focal plane) and astigmatism (where rays that propagate in two perpendicular planes have different foci).

Previous studies of Holographic Optical Elements [D. H. Close, "Holographic Optical Elements", Optical Engineering, Vol 14, No 5 pp 409-419, 1975] concluded that the strong dependence of the HOE's imaging properties on the operating wavelength due to their diffractive nature makes it more difficult to design achromatic optical systems with HOE than conventional optics. This difficulty has resulted in HOE used only in quasi-monochromatic or narrowband ($\Delta\lambda$<10 nm) applications.

For imaging applications, traditional refractive and reflective optical elements and their holographic replacements accept input light and relay that light to an image conjugate plane. In many imaging applications, a particular instantiation of a HOE called a zone plate is used for in-line focusing. [Zone Plates and Their Aberrations: M. Young, Electrophysics and Electronic Engineering, Rensselaer Polytechnic Institute, NY, OSA Vol. 62 No. 8, pages 972-976.]. The ideal zone plate can be considered as a hologram of coaxial collimated and spherical beams also called a Gabor plate. Such a holographic optical element works as an on-axis lens and provides diffraction-limited performance in paraxial approximation in narrowband wavelength ($\Delta\lambda \leq 10$ nm) range. Other examples of the applications where the zone plates show superior performance compared to regular refractive optics are: image projection in the deep UV spectral range where regular optics become opaque or multi-focus lens made by stacking of zone plates in single film [Banyai, William Charles et al. "Composite holographic multifocal lens", US 20010050751], wide field of view projection using segmented zone plates [Spitz, Eric, et al., "High-resolution, wide-field holographic lens", U.S. Pat. No. 4,094,577, and Close D., "Extended-field holographic lens arrays", U.S. Pat. No. 3,807,829]. However the biggest disadvantage of the zone plate is that the light is diffracted into multiple diffraction orders, which results in both low diffraction efficiency (DE<40%) in the desired diffraction order and low image contrast because of crosstalk (unwanted signal or noise introduced by one optical signal onto another optical signal) with unwanted diffraction orders.

Other known attempts to address the low diffraction efficiency in narrowband imaging applications have been explored including shaping the grooves of the zone plates (Fresnel lens, blazed diffraction structure, etc.,) allowing them to direct input light energy to only one diffraction order. However, these approaches significantly complicate the manufacturing process and makes fabrication of large HOEs problematic [D. H. Close, "Holographic Optical Elements", Optical Engineering, Vol 14, No 5 pp 409-419, 1975].

Other authors [Pernick, Benjamin J., "In-line holographic lens arrangement", U.S. Pat. No. 4,810,047] have suggested making an on-axis zone plate with suppressed strait light of 0-th diffraction order by combining it with a polarization rotator and polarization filter, and using the fact that polarization rotation of diffracted focusing beam is different than that of collimated 0-th order beam. However, such a structure further decreases the amount of light in the focusing beam due to absorption of the polarizers and the angular dependence of the polarization rotation results in non-uniformity in the focusing beam passing through the polarization filter.

Other attempts [D. L. Dickensheets. "Imaging performance of off-axis planar diffractive lenses", Vol. 13, No. 9/September 1996/J. Opt. Soc. Am. A, pp 1849-1858] to improve the diffraction efficiency in transmission VHOE systems have explored off-axis focusing. Single order volumetric holograms working in the Bragg regime have been fabricated which resolve the issues of low contrast due to the cross-talk between multiple diffraction orders seen in Gabor zone plates. To operate in the Bragg regime, off-axis angles should be larger than $\theta_{min}$ derived from the following formula [Coupled Wave Theory for Thick Hologram Gratings, Herwig Kogelnik, Bell System Technical Journal, Volume 48, Issue 9, pages 2909-2947. November 1969]

$$\cos\theta_{min} = \frac{\lambda}{2d\Delta n} \quad (2)$$

This condition corresponds to 100% diffraction of the input beam to the first diffraction order. The high diffraction angles introduce significant astigmatism due to the asymmetry in the diffraction pattern. The large diffraction angles also increase the chromatic aberration according to the Bragg equation. In addition to introducing astigmatism and chromatic aberration, the off-axis VHOE requires a more complicated design architecture to accommodate the off-axis constraints and cannot be used as a direct replacement for an on-axis refractive optical element.

While numerous attempts have been made to fabricate a volume holographic optical element capable of providing on-axis imaging, there are no reports of a VHOE capable of working in on-axis geometry while providing high diffraction efficiency (>75% and preferably greater than 95%) for desired diffraction order and suppressing the unwanted diffraction orders (<0.1%) and reducing the chromatic aberrations and astigmatism. Current attempts to expand reflection VHOE to broadband operation (>10 nm) show significant chromatic aberration and astigmatism making them impractical for imaging applications.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

This invention describes the design and fabrication of two types of VHOEs (transmission and reflection) that provide high diffraction efficiency and reduce chromatic aberrations and astigmatism in imaging applications. These VHOE can be used for imaging at one or more wavelengths in applications such as telescopes, image projection, and other optical systems. The lens can provide optical power (magnification) within the bandwidth centered relative to several wavelengths to either focus or collimate light and is transparent for the rest of the image spectrum. The size of each bandwidth can be controlled by proper choice of VHOE parameters in order to keep the lens aberrations within acceptable range. Each bandwidth may be narrowband (<10 nm) or broadband (>10 nm). These VHOEs can be used in a significant number of applications which employ broadband sources such as light emitting diodes (LED), organic light emitting diodes (OLED), supercontinuum sources (SLD/SLED) and silicon optical amplifiers (SOA) without the need for safety and regulatory issues associated with laser sources.

For the invention to achieve high diffraction efficiency and to correct for inherent aberrations caused by large diffraction angles and broadband sources, the traditional VHOE designs must be modified. In transmission mode, the embodiment employs two VHOEs fabricated to create an on-axis imaging system that minimizes chromatic aberrations introduced by the bandwidth of the input light and the astigmatism. The two VHOEs are designed and fabricated in such a way as to introduce compensating adjustments that minimize the chromatic aberrations across the bandwidth and reduce the astigmatism while maintaining high diffraction efficiency. In reflection mode, a single VHOE is configured to act as a mirror at the specified wavelength and bandwidth and to form an image and, consequently, has minimal level of astigmatism and chromatic aberration.

In an embodiment of a transmission mode lens or composite lens (CL), a first VHOE (VHOE1) is fabricated using a collimated reference beam at a recording angle and a first object beam parallel to a surface normal both at a known wavelength to record a diffraction pattern in a recording media. The diffraction pattern is configured to receive broadband light and deflect through transmission light at the known wavelength with a bandwidth at a known angle to the surface normal of the VHOE1 equal to the recording angle to form an off-axis output beam. A second VHOE (VHOE2) is fabricated by interfering a collimated reference beam at the same recording angle with a second object beam parallel to the surface normal to record a diffraction pattern on a recording media. The second diffraction pattern is configured to accept the off-axis output beam at the known wavelength and the known angle and to form through diffraction an on-axis output beam at the known wavelength and bandwidth to form an image. One of the object beams is non-collimated, its shape determining optical power of the diffraction pattern to magnify the output beam to form the image.

The VHOEs are fabricated using reference beams that share common properties of at least angle of incidence, wavelength, and beam shape so that the aberrations in the output of the first HOE are compensated by the second VHOE, or alternately the first VHOE "compensates" for aberrations induced by the second VHOE. As the physical distance between the HOE becomes vanishingly small the aberrations can be exactly compensated. The diffraction efficiency of the CL is at least 75% over the bandwidth and preferably at least 95%.

These concepts can be extended from one wavelength or color to multiple color VHOEs by simultaneously writing multiple interference patterns, one for each wavelength, as a diffraction pattern in the same recording medium. For transmission, the first VHOE will direct the different colors along different diffraction axes (e.g., different known angles) and the second HOE will collect the different colors at the different known angles and redirect each color to a common on-axis focal point. The different known angles are suitably spaced at 360/N degrees where N is the number of wavelengths to minimize cross-talk.

In a multi-wavelength on-axis transmission system, the aberrations can be further minimized by combining two sets of VHOE composite lenses into a lens assembly with adjustments that expand the lens bandwidth. By combining two CL with the proper choice of spacing, the doublet system can offer improved collimation and reduced chromatic aberration over a wider bandwidth. By fabricating the two composite lenses with the same focal length f1=f2 and separating the two composite lenses by a distance d=0.67f where f is the focal length of the doublet, the achromatic doublet holographic lens becomes achromatized to the first order across a range of wavelengths that can exceed 100 nm.

In an embodiment of a reflection mode lens, reflection mode VHOE is fabricated with diffraction fringes substantially parallel to the surface of the recording media to act as a bandpass filter reflecting and magnifying the known wavelength and bandwidth and passing the unwanted wavelengths. The diffraction pattern of the hologram includes a primary component in which the fringes are parallel to the surface to provide achromatic reflection over the bandwidth and a secondary component in which the fringes have a measure of curvature to the top surface to provide optical power to magnify the output beam, the amount of deviation of the fringes from parallel determined by an f-number of the lens. At the design wavelengths the reflection VHOE acts as a mirror and, consequently, has minimal level of chromatic aberration when used for imaging, as discussed above. The bandwidth of the reflection VHOE can be controlled by proper choice of hologram thickness and index modulation. The VHOE is fabricated with diffraction fringes substantially parallel to the surface of the recording media by illuminating the recording medium at the same angle but from opposite sides of the medium. Such a recording configuration ensures that light incident at the recording angle with the bandwidth centered on the known wavelength will be reflected by the VHOE at the incident angle and the other wavelengths will pass through the VHOE. The reflected beam will also be diffracted by the VHOE to focus light to form an image as recorded by the object beam.

For a color system, multiple (e.g., three) color holograms can be printed simultaneously on a common recording media at different wavelengths (e.g., RGB) with a common focal point while the unwanted portions of the while light spectrum pass through the HOE undiffracted since they do not satisfy the Bragg condition.

The transmission and reflective mode VHOEs may also be configured for applications other than traditional imaging such as multi-focus lenses and lens arrays in which the object beam for recording the diffraction grating is selected to perform an optical function such as multiplexing in the axial or lateral dimensions. In this case, the diffraction grating would be configured to more generally shape the direction and wavefront of the output beam as opposed to the specific application of forming an image. The improved performance of the VHOEs in the form of higher diffraction efficiency and lower chromatic aberrations and astigmatism over the bandwidth would have the beneficial effect in these other applications.

These and other features and advantages of the invention will be apparent to those skilled in the art from the following detailed description of preferred embodiments, taken together with the accompanying drawings, in which:

DETAILED DESCRIPTION OF THE INVENTION

This invention describes the design and fabrication of two types of VHOEs (transmission and reflection) that can be used in traditional imaging and other applications. These VHOE provide high diffraction efficiency with minimal aberrations and can be used for imaging at one or more wavelengths in applications such as telescopes, image projection, and other optical systems. The VHOE lenses provide optical power (magnification) within the bandwidth centered relative to several wavelengths and is transparent for the rest of the image spectrum. The size of each bandwidth can be controlled by proper choice of VHOE parameters in order to keep the lens aberrations within acceptable range. Each bandwidth may be narrowband (<10 nm) or broadband (>10 nm). These concepts are further extended to create VHOEs that operate with high diffraction efficiency at multiple wavelengths (colors) with each wavelength having a separate bandwidth. These VHOEs can be used in a significant number of applications which employ broadband sources such as light emitting diodes (LED), organic light emitting diodes (OLED), supercontinuum sources (SLD/SLED) and silicon optical amplifiers (SOA) without the need for safety and regulatory issues associated with laser sources.

To achieve high diffraction efficiency and to correct for inherent aberrations introduced in imaging applications with broadband sources, the traditional VHOE designs must be modified to achieve high-resolution imaging and improved performance in other non-imaging applications.

As previously described, in transmission mode traditional on-axis VHOE designs employ a single zone plate or a Gabor plate that is fabricated using coaxial collimated and spherical beams. The on-axis VHOE exhibits low diffraction efficiency (≤40%) into the focal spot and deliver low image contrast because of crosstalk with unwanted diffraction orders. A traditional off-axis VHOE design operates in the Bragg regime to improve DE (>90%) but introduces high levels of chromatic aberration and astigmatism. In the present invention, two VHOE are designed and fabricated in such a way as to provide high diffraction efficiency and introduce compensating adjustments that minimize the astigmatism and chromatic aberrations. Two VHOEs that form a "composite lens" (CL) are required to provide an on-axis imaging system to magnify light to form an image and reduce the chromatic aberrations and astigmatism across the bandwidth while maintaining high diffraction efficiency (DE) and low noise.

In reflection mode, the traditional VHOE designs provide high diffraction efficiency but introduce significant aberrations when used in imaging applications due to Fresnel refraction.

In the present invention, a single reflective VHOE is configured to act as a mirror at the specified wavelength and bandwidth and to magnify light to form an image and, consequently, has minimal level of astigmatism and chromatic aberration. This is accomplished by fabricating the single VHOE so that the fringes of the diffraction pattern are parallel to the surface of the recording media and by using a spherical object beam to record the diffraction pattern to magnify the light.

The transmissive composite lens and the reflective VHOE lens, as all optical lenses, perform different but related transforms on the input light depending on the direction light traverses the lens. For the transmission lens, collimated light entering from the same side as the reference beam used for recording is brought to a focus. Conversely, input light diverging from the focal point will pass through the composite lens and be collimated. The same symmetry is present in the reflective lens where collimated light reflecting from the surface is brought to a focus and light diverging from the focal point is collimated. In either case, a diffraction pattern is recorded to include optical power to magnify light (larger or smaller) to focus or collimate the output beam to form the image.

Transmission-Mode Composite Lens

Figure 1:
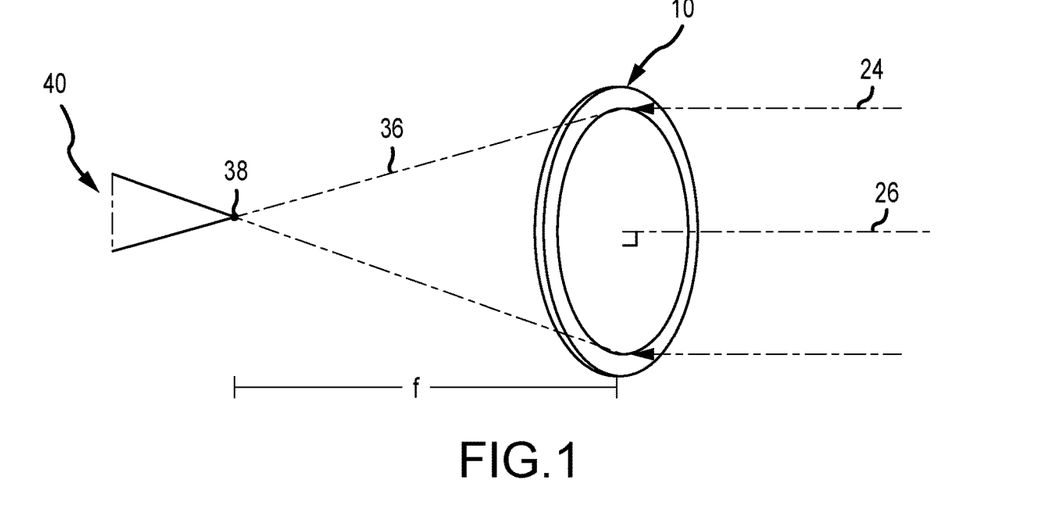
FIGS. 1 and 2 are perspective and detailed illustrations of an embodiment of a transmission mode composite lens including first and second VHOEs.
Figure 2:
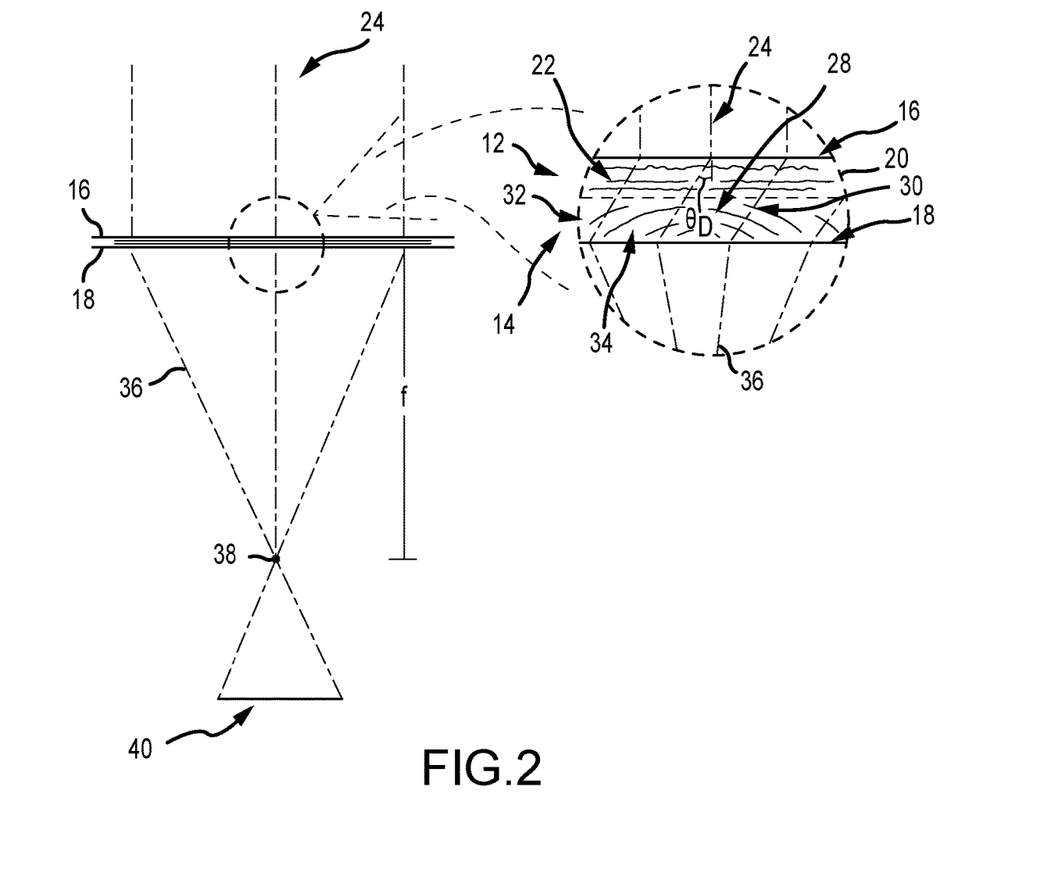
Figure 3A:
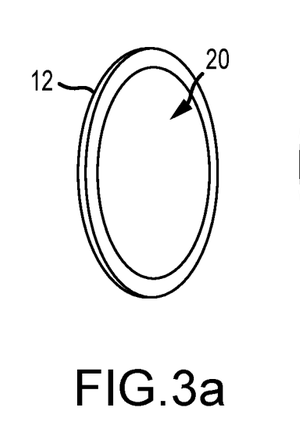
FIGS. 3a-3d are illustrations of an embodiment of a method of fabricating the transmission mode composite lens.
Figure 3B:
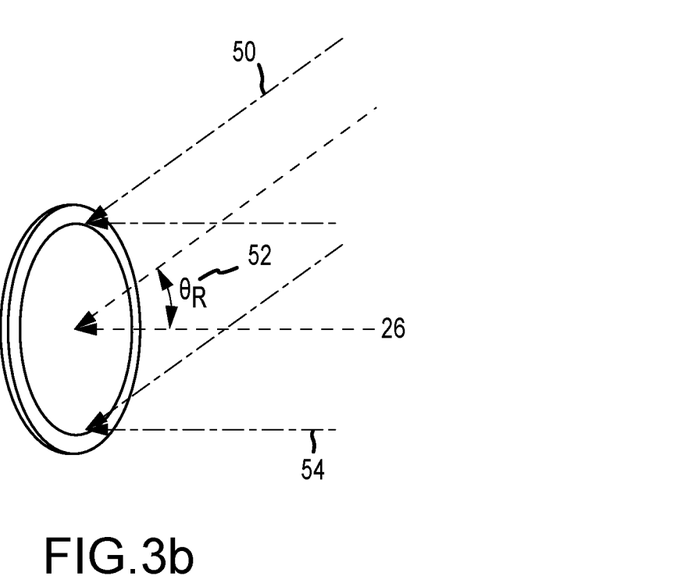
Figure 3C:
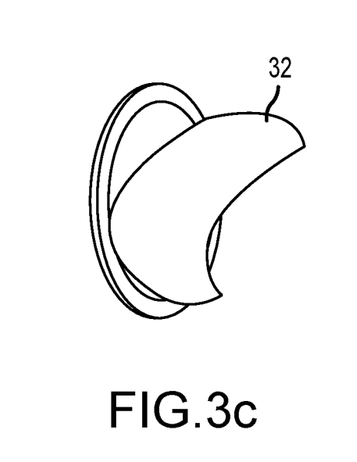
Figure 3D:
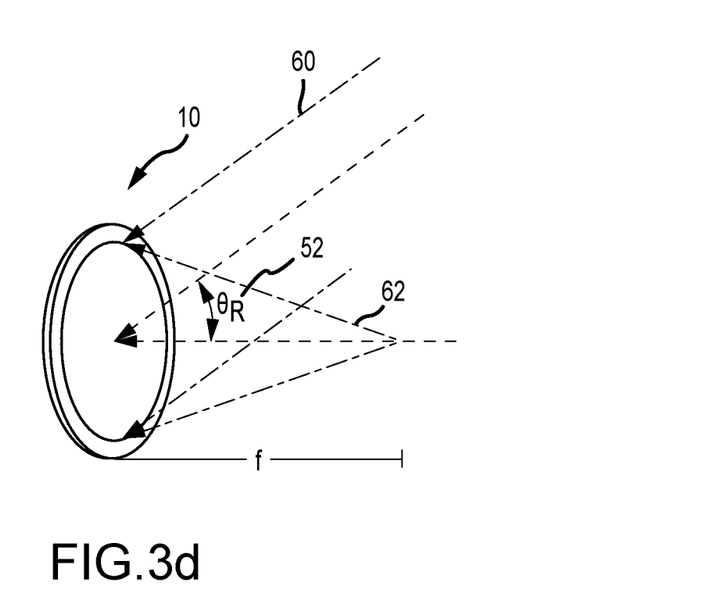
Figure 4:
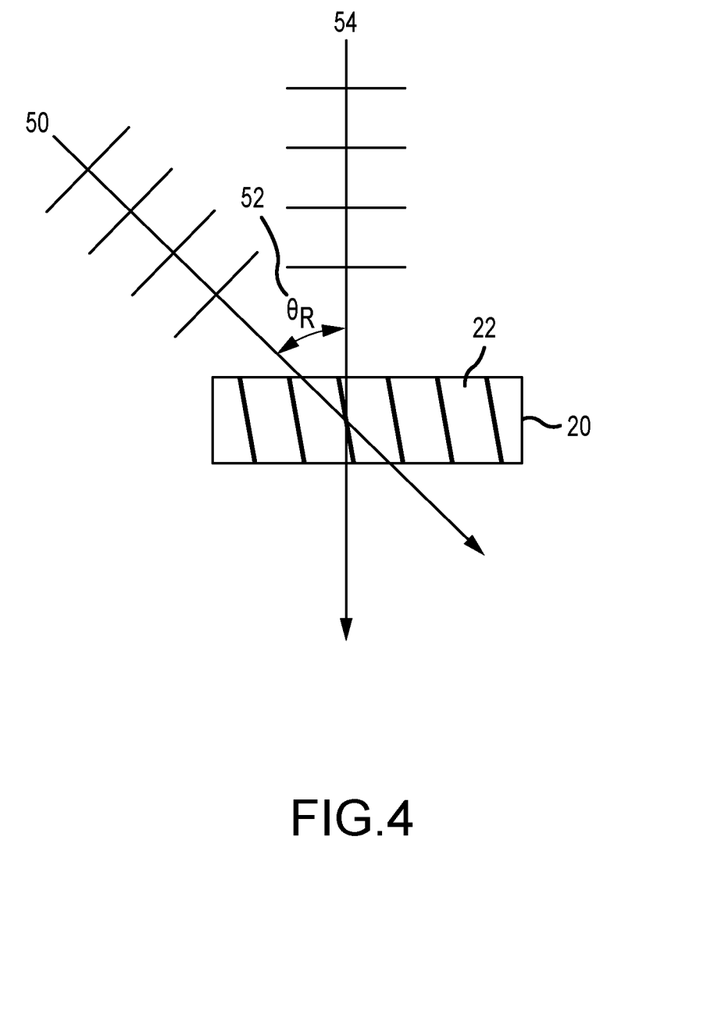
FIG. 4 is a diagram of an embodiment of the wavefront direction and interference pattern for plane grating object and reference beams for a transmission mode VHOE.

As shown in FIGS. 1 and 2, in an embodiment, an on-axis single bandwidth transmission mode composite lens 10 comprises first and second transmission mode Volume Holographic Optical Elements VHOE1 12 and VHOE2 14 sandwiched between glass substrates 16 and 18. VHOE1 12 comprises a holographic recording media 20 and a diffraction pattern 22 recorded on the recording media. Diffraction pattern 22 is configured to receive broadband light 24 on-axis along a surface normal 26 to VHOE1 and deflect through transmission light at a known wavelength and bandwidth at a known angle $\theta_D$ 28 to the surface normal 26 to form an off-axis output beam 30. VHOE2 14 comprises a holographic recording media 32 and a diffraction pattern 34 recorded on recording media 32. Diffraction pattern 34 is configured to accept the off-axis output beam 30 at the known wavelength and the known angle and to form and focus through diffraction an on-axis output beam 36 at the known wavelength at a focal point 38 to form an image 40 at a conjugate plane.

The two VHOE are configured to introduce compensating adjustments that minimize the chromatic aberrations introduced by the bandwidth of the input light and astigmatism. VHOE1 compensates for aberrations induced by VHOE2. The pair of VHOEs is required to provide an on-axis imaging system to focus light to form an image and reduce the chromatic aberrations across the bandwidth and reduce the astigmatism while maintaining high diffraction efficiency (DE) and low noise.

This on-axis geometry achieves diffraction efficiencies of >75% can be achieved over the lens' bandwidth and suppresses unwanted diffraction orders to <1%. The remaining light in the bandwidth is either scattered or absorbed. The light outside of the bandwidth passes through the VHOE. In many cases, the DE>95% over the bandwidth can be achieved and unwanted diffraction orders can be suppressed to <0.1%. The lens' bandwidth can be increased to greater than 10 nm depending on the requirements of the resolution of the VHOE by varying the incidence angles of the reference beam and choosing the holograms thickness and index modulation. Furthermore, the on-axis geometry minimizes chromatic aberrations and astigmatism over the bandwidth.

As shown in FIGS. 3a-3d and 4, in an embodiment, on-axis single bandwidth transmission mode composite lens 10 is fabricated by applying holographic recording media 20 to glass substrate 12. A collimated reference beam 50 at a recording angle $\theta_R$ 52 to the surface normal 26 is interfered with a collimated object beam 54 parallel to surface normal 26 to create an interference pattern that is recorded as diffraction pattern 22 (See FIG. 2) in recording media 20 to form VHOE1. Narrowband sources such as lasers at the known wavelength are used to provide the reference and object beams. Recording angle 52 determines the known angle at which diffraction pattern 22 will deflect input light. The VHOE1 hologram is developed according to the usual development procedure for the particular holographic media. The holographic media used in creating VHOE1 may be covered with a thin (≤100 micron) transparent layer if needed to ensure chemical and or mechanical stability during the exposure and processing of VHOE2.

VHOE2 is fabricated by applying a holographic recording media 32 (which can be the same type of media used in VHOE1 or a different media) to the surface of VHOE1. Diffraction pattern 34 (shown in FIG. 2) is recorded using a reference beam 60 having the same properties (same angle, wavelength, beam properties) as used in recording VHOE1 and an object beam 62 that is a diverging waveform with the desired focal length. Reference beam 60 is suitably reference beam 54. VHOE2 accepts light at the known angle from VHOE1 and focuses the light to form the image. The VHOE2 hologram is developed according to the usual development procedure for the particular holographic media. The holographic media used in creating VHOE2 may be covered with a thin transparent layer if needed to ensure chemical and or mechanical stability during use.

When these two VHOEs are used in combination, they function as an on-axis lens as shown for a single λ. Equation 3 [D. H. Close, "Holographic Optical Elements", Optical Engineering, Vol 14, No 5 pp 409-419, 1975]the shows relationship between the principal input angle 24 ($\theta_1$) and output angle ($\theta_2$) and the wavelength of the CL.

$$d(\sin\theta_1 + \sin\theta_2) = \frac{\lambda}{n} \quad (3)$$

Large input or diffraction angles introduce significant chromatic aberration. For the on-axis transmission CL, $\theta_1=0$ for the collimated input beam and principal ray $\theta_2$ of the output beam is also zero. $\theta_2$ for the marginal rays 36 are a function of the f-number of the system. The chromatic aberrations for the VHOE would be the same as for the zone plate but with much higher DE and much lower noise. The on-axis geometry of this composite lens (CL) will have minimal chromatic aberration and negligible astigmatism since it minimizes the diffraction angles, which results in minimal dispersion.

Decreasing astigmatism further is possible by minimizing the distance between HOE1 and HOE2 to less than 100 microns by shortening the path of the image that propagates in the off-axis geometry. The aberrations in the CL system can be further minimized by placing VHOE1 and VHOE2 in contact with one another on the surface of a glass/plastic substrate.

The resolution of transmission mode CL 10 can be estimated by noting that the diffraction pattern of CL is similar to that of the hologram recorded using coaxial planar and spherical beams [Zone Plates and Their Aberrations: M. Young, Electro-physics and Electronic Engineering, Rensselaer Polytechnic Institute, NY, OSA Vol. 62 No. 8, pages 972-976.] that represents a zone plate. Thus, without sacrificing accuracy, we can apply the formulism of a Zone Plate to derive CL parameters. According to [Young], chromatic aberration will not be noticeable if the radius r of the imaging lens is equal to or less than:

$$r^2 = \frac{f\lambda^2}{\Delta\lambda} \quad (4)$$

where f is focal length, λ is the central design wavelength, and Δλ is interpreted as FWHM (full width half maximum) of the illumination source.

Combing Eq. 4 with Rayleigh resolution criteria:

$$\Delta l = 1.22 f \frac{\lambda}{r} \quad (5)$$

provides an estimate of the maximum spectral width of image beam Δλ to keep resolution of such a lens better than Δl. The spectral width of the image can be controlled by the bandwidth of the HOEs, which obeys equation 5[Fabrication of Diffractive Optical Elements. Springer, E. Di Fabrizio, L. Grella, M. Baciocchi, M. Gentili, p, 149-160. 1997.], $$\frac{\Delta\lambda_{FWHM}}{\lambda} \sim \frac{\Lambda}{d}\cot(\theta) \quad (6)$$

where Λ is the average period of the holographic grating, d is the film thickness, and θ is the Bragg angle. By choosing proper grating parameters, one can fix the resolution of CL better than Δλ of Eq. 6.

Although the diffractive properties are similar, transmission mode CL10 has four significant advantages over that of a single element narrow band Zone Plate:
1. The diffraction efficiency can be much higher; >75% or even >90% vs. 25-30% for zone plate.
2. The transmission bandwidth of transmission mode CL 10 can be controlled by the designer to achieve both high resolution (diffraction limited focal spot) AND minimize the aberrations to an acceptable ranges required by the imaging application by adjusting the thickness and refractive index of the VHOE. For zone plates, the aberrations cannot be adjusted.
3. The CL suppresses all unwanted diffraction orders below 1% (0.1% is typical) and consequently provides much higher contrast in imaging applications.
4. As we will describe below, CL VHOE can combine multiple wavelength bands in single VHOE film, which makes the CL suitable for broadband imaging.

Multi-Wavelength Transmission Mode Composite Lens

The concepts used to minimize aberrations in single wavelength CL can be expanded to VHOEs operating at multiple wavelengths to design and fabricate a CL that can be used in multi-wavelength or "color" applications. For most visible commercial applications, the imaging sources comprise three sources emitting at different wavelengths roughly corresponding to the tri-stimulus values of the human eye. The devices typically emit at the red, green, and blue (RGB) wavelengths in the visible spectrum. For applications in the infrared (IR) or ultraviolet (UV) multiple wavelengths will be selected depending on the sources and detectors available.

For multi-color transmission and reflection applications, the traditional fabrication technique is to fabricate and combine multiple holograms, one of each color, or to simultaneously record the holograms for each color in the recording media. Both the combination and simultaneous recording techniques have been unsuccessful due to the crosstalk that occurs when multiplexing multiple holograms in a single film layer or layer stack. The crosstalk reduces the contrast of the image because light at one wavelength is scattered by the diffraction grating recorded to diffract another wavelength.

Figure 5A:
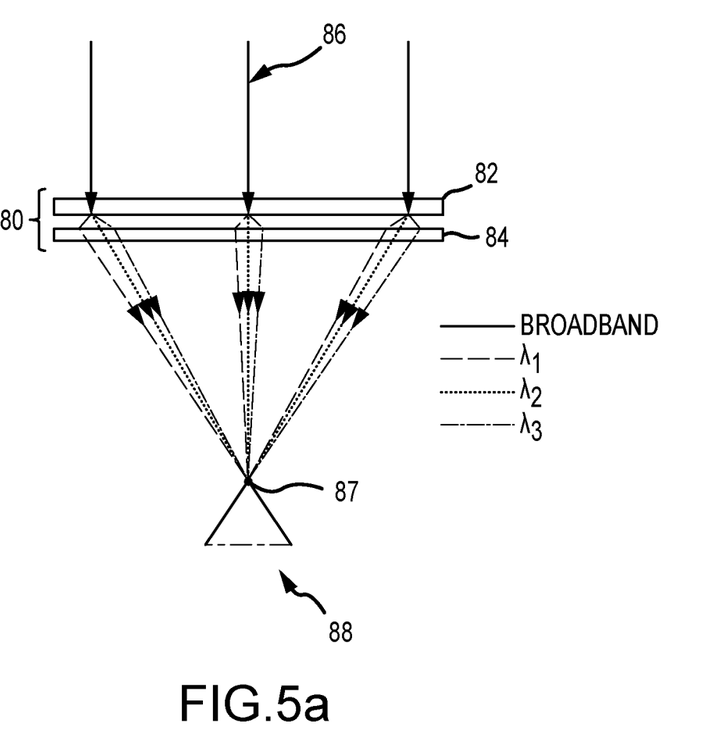
FIGS. 5a and 5b are diagrams of an embodiment of a full color transmission mode composite lens and the diffraction geometry of the composite lens for minimizing crosstalk between color channels.
Figure 5B:
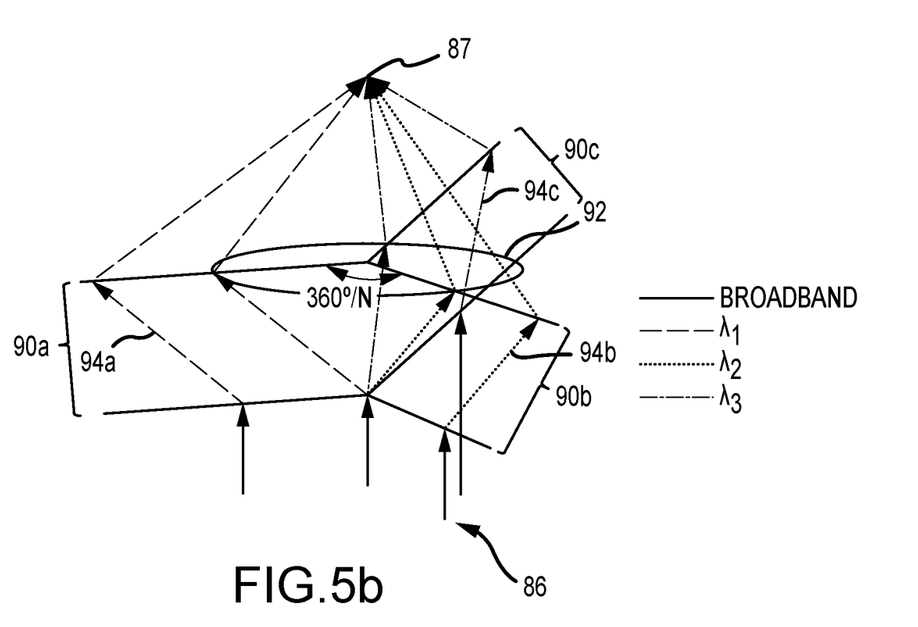

As shown in FIGS. 5*a* and 5*b*, a multi-wavelength transmission mode CL 80 is fabricated using techniques to simultaneously record a hologram associated with each of the wavelengths during a single exposure as a diffraction pattern on a recording media. For example, for RGB illumination, 3 pairs of reference and object beams simultaneously form 3 interference patterns that are superimposed and recorded to form the diffraction pattern. This design will enable the CL 80 to combine multiple wavelengths in a way that can achieve the resolution equivalent to the single bandwidth lens described above for each wavelength. For both VHOE1 82 and VHOE2 84, the multiple holograms can be combined in a single film fabrication using a single multi-wavelength exposure. The fabrication combines the wavelengths from separate lasers, resulting in a multi-wavelength hologram. VHOE1 and VHOE2 contribute to function as a three-color lens to spectrally filter on-axis broadband light 86 and focus the light at a focal point 87 to form a three-color image 88 at an image conjugate plane of the CL.

The present invention overcomes the crosstalk problem by designing the diffraction gratings for each wavelength to diffract the light at a different angle relative to the surface normal. As shown in FIG. 5b, planes 90a, 90b and 90c for each wavelength are rotated relative to each other at 360°/N where N is the number of wavelengths and the circle 92 is in the plane of the recording media. The process can also compensate for any decrease in DE by increasing Δn and/or film thickness to bring DE for each channel to its first maximum in accordance with Eq. 5. FIG. 5b shows the diffraction geometry for each wavelength from the input of the multicolored beams 86 to the angle of incidence of the CL optical axis. The collimated white light illuminating VHOE1 diffracts the three exposure wavelengths onto vectors 94a, 94b and 94c that lay in planes 90a, 90b and 90c, which are separated by 120°. As a result, there is no crosstalk (unwanted signal or noise introduced by one wavelength in the signal of another wavelength) between them. These wavelengths are then focused by VHOE2 to the designed focal distance. VHOE2 is designed and fabricated to accept each of the wavelengths at the known angles and bring them to a common focal point. Such a design combines several independent channels with negligible crosstalk, and independently controls the bandwidths for each λ. These factors will allow for fabrication of a visible CL with any predetermined resolution and color mixing for white light image projection systems. For applications where a larger wavelength range is needed, additional λ bandwidths can be easily added to the VHOE1 and VHOE2 to increase or decrease the overall spectral coverage or shift the center wavelength toward the IR or UV without affecting resolution.

The fabrication for the multi-wavelength CL systems follows the same sequence of operations as described above but with the reference beam used to fabricated VHOE1 and VHOE2 rotated about the surface normal by 360°/N (where N is the number of wavelengths). The N object beams for VHOE1 and VHOE2 are all co-axial and parallel to the surface normal.

Multi-Wavelength Achromatic Doublet

Figure 6:
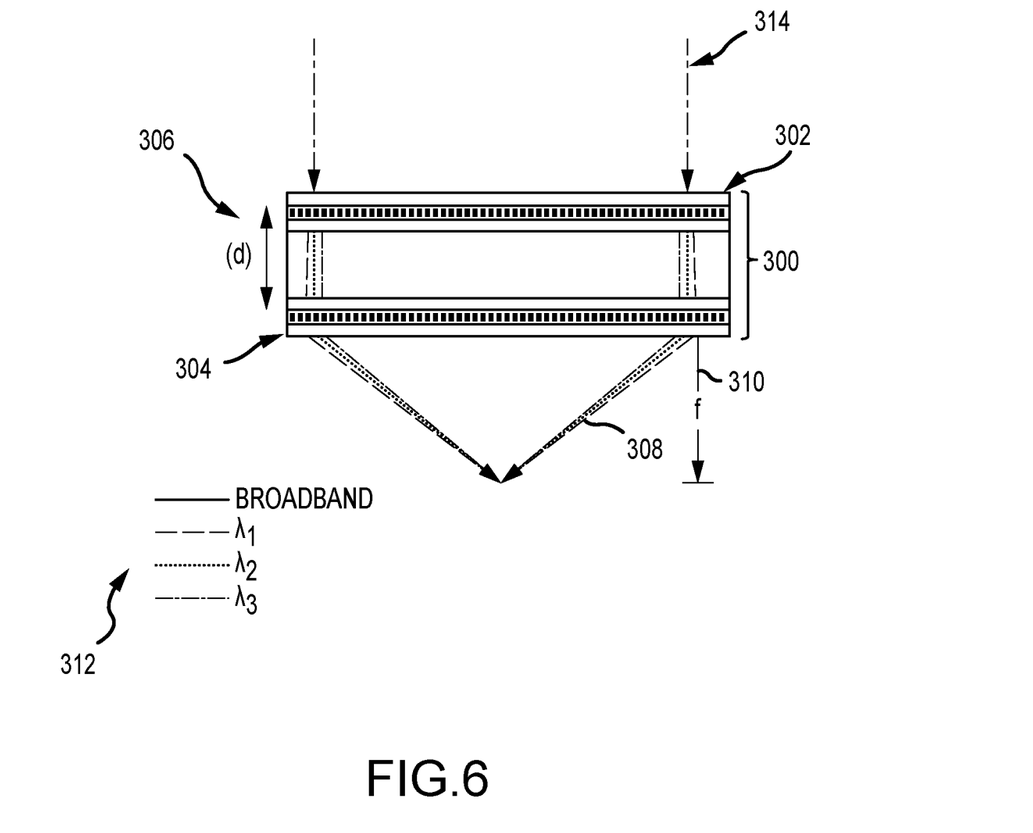
FIG. 6 is a diagram of a transmission mode composite lens doublet.

As shown in FIG. 6, two transmission mode composite lenses 302 and 304 can be combined into an achromatic doublet 300 to further reduce the chromatic aberration across a larger range of wavelengths 312 of broadband light 314. The doublet 300 may exhibit achromatic behavior over a wavelength range of ~100 nm. The two CLs 302 and 304 are fabricated using the same processes described above.

Using a well-known formula for combined focal length f of two lenses with focal length $f_1$ and $f_2$, $$\frac{1}{f} = \frac{1}{f_1} + \frac{1}{f_2} - \frac{d}{f_1 f_2}, \quad (7)$$

and noting that the focal length of the VHOE is inversely proportional to wavelength λ, the separation d 306 between the CLs can be determined that corresponds to their achromatic performance over a wavelength range between $\lambda_1$ and $\lambda_2$ by requiring same combined focal length f 310 at the two extreme wavelengths $\lambda_1$ and $\lambda_2$.

Straight-forward calculation shows that a combination of two CL 302 and 304 with the same focal length $f_1=f_2$ separated at the distance d=0.67f, an output beam 308 becomes achromatized to the first order. This technique can be used to extend the range of achromatization to 100 nm thus covering a much wider spectral range than each CL can on its own [Spectral Diffraction Efficiency Characterization of Broadband Diffractive Optical Elements Junoh Choi, Alvaro A. Cruz-Cabrera, Anthony Tanbakuchi, Sandia National Laboratories, March 2013] producing an achromatic holographic lens.

Reflection Mode Lens

Figure 7:
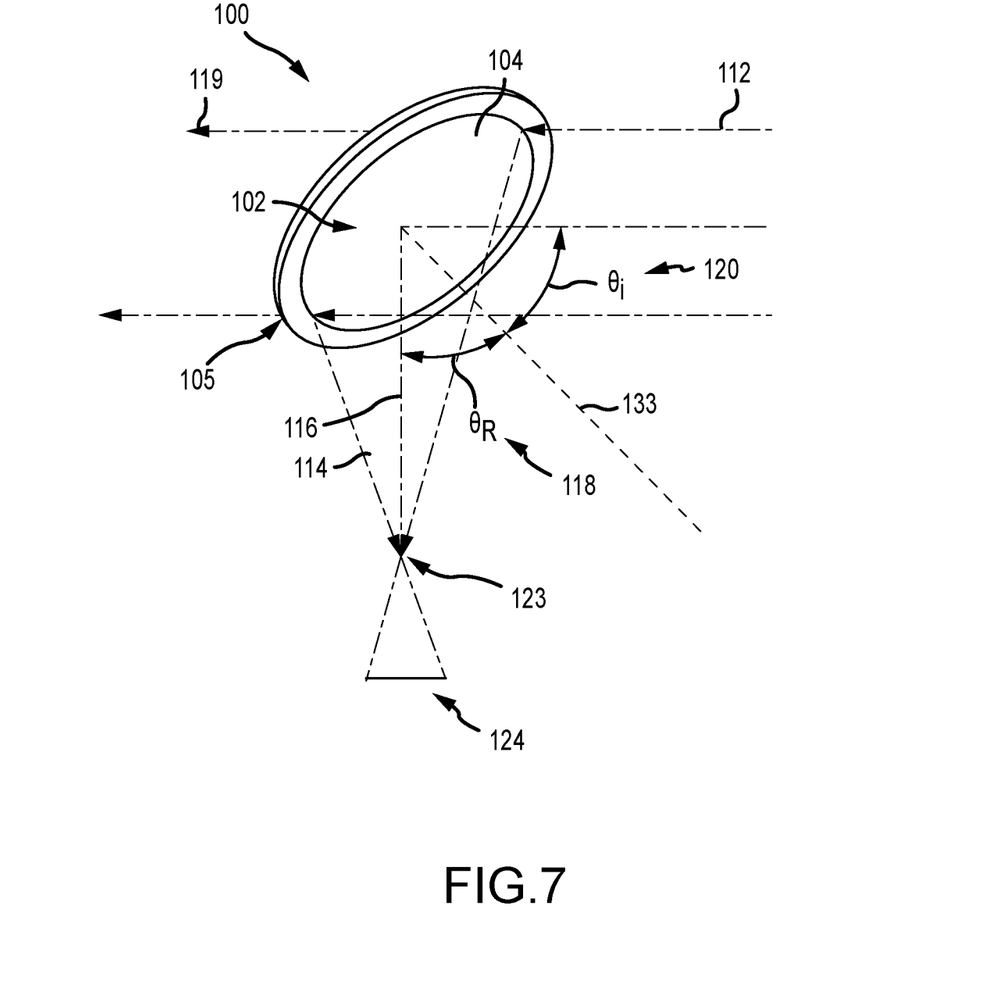
FIG. 7 is a perspective view of an embodiment of a broadband reflection mode HOE.
Figure 8:
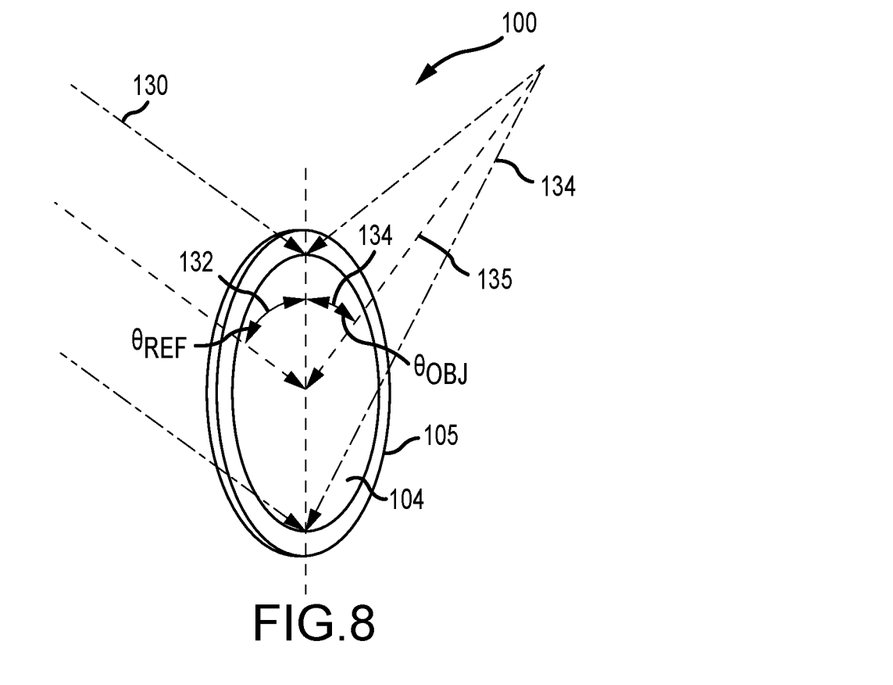
FIGS. 8 and 9 are diagrams of a method of fabricating the reflection mode VHOE, the wavefront direction and interference pattern for plane grating object and reference beams for the reflection mode VHOE and the interference pattern of the VHOE.
Figure 9:
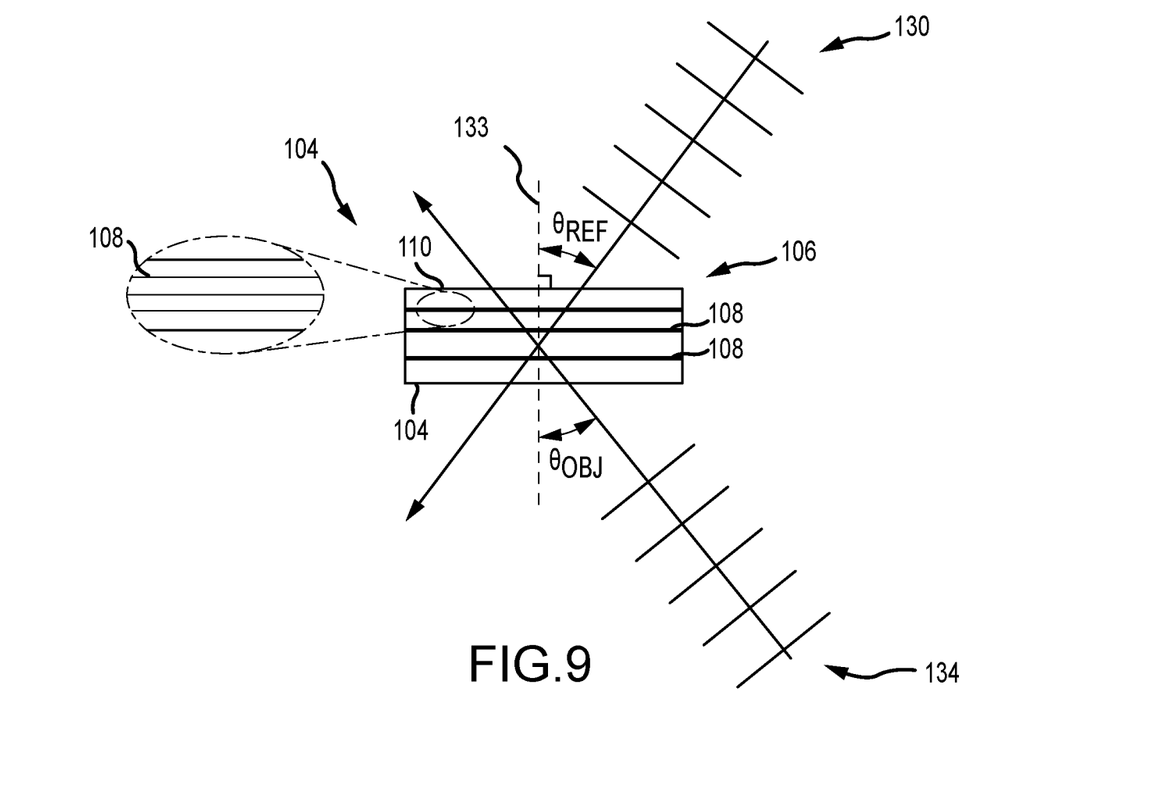

As shown in FIGS. 7-9, in an embodiment, an off-axis single bandwidth reflection mode lens 100 comprises a reflection mode volume holographic optical element (VHOE) 102. VHOE 102 comprises a recording media 104 applied to a glass substrate 105 and a diffraction pattern 106 recorded on the recording media with fringes 108 of the diffraction pattern substantially parallel to a top surface 110 of the recording media. Diffraction pattern 106 is configured to receive broadband light 112 and achromatically reflect light at a known wavelength and bandwidth and transmit other wavelengths to form an output beam 114 with a principal ray 116 at an angle $\theta_R$ 118 equal to an angle of incidence $\theta_i$ 120 of broadband light 112 and to focus through diffraction the output beam 114 at a focal point 123 to form an image 124 at a conjugate plane.

Diffraction fringes parallel to the surface of the recording media acts as a bandpass filter centered at the known wavelength that reflects the wanted wavelengths in the bandwidth like a mirror and passes unwanted wavelengths 119 outside the defined bandwidth. The diffraction pattern 106 and fringes 108 include in the design a first component that is parallel to the surface to provide the achromatic reflection over the specified bandwidth and a second compute that is not parallel to the surface to provide the optical power or magnification that provides the focusing. The power of the lens or "f-number" determine how much deviation there is in the fringes from parallel. The stronger the lens the more the deviation.

As shown in FIGS. 8 and 9, in an embodiment, off-axis single bandwidth reflection mode lens 100 is fabricated by applying the holographic media 104 to the glass substrate 105. A collimated reference beam 130 at an angle of incidence $\theta_{REF}$ 132 (between 0 and 90 degrees) from a surface normal 133 of the holographic media is interfered with a spherical object beam 134 having a principle ray 135 at an angle of incidence $R_{OBJ}$ 136 to the surface normal from the opposite side of the recording media. The angles of incidence of the reference and object beams $\theta_{REF}$ 132 and $\theta_{OBJ}$ 134 being equal and opposite with the magnitude of the angles of incidence for recording being equal to the angle of incidence $\theta_i$ 120 of the readout beam e.g. broadband light 112. The reflective VHOE hologram is developed according to the usual development procedure for the particular holographic media. The holographic media used in creating VHOE may be covered with a thin (≤100 micron) transparent layer if needed to ensure chemical and or mechanical stability of the reflective lens.

The equal angular illumination during the holographic recording creates a VHOE 104 with diffraction fringes 108 substantially parallel to the surface of the holographic film. This parallelism is modified to some extent by the optical power induced by the focusing object beam. The amount of deviation from parallel is determined by the power or f-number of the lens. This holographic fringe pattern acts as a high diffraction efficiency (DE>95%) mirror at the design wavelength and bandwidth. The reflective nature of the diffraction ensures the system has a minimal level of chromatic aberration when used for imaging. Chromatic aberration for such a HOE is minimal also because of the narrow-band nature of reflection volumetric holograms and their bandwidth can be controlled by proper choice of hologram thickness and index modulation [Coupled Wave Theory for Thick Hologram Gratings, Herwig Kogelnik, Bell System Technical Journal, Volume 48, Issue 9, pages 2909-2947, November 1969]. Recording and reconstruction geometry for such a VHOE is shown in FIG. 9.

The reflection lens 100 as designed and fabricated as described above provides distortion-free see-through functionality where light can pass from the backside of the VHOE since light is traveling at angles that do not satisfy the Bragg equation and are not diffracted. This functionality is combined with a VHOE that provides optical power to create an image combiner with capabilities can't be achieved using standard refractive or reflective optics. Other embodiments of image combiners use semitransparent metallic coatings to integrate the pass through light and the reflected light but these embodiments cannot provide image magnification or minification without introducing considerable distortion by adding a curved reflecting surface.

While there are significant similarities between the function of reflection and transmission VHOEs, reflection VHOEs have two advantages:

Reflection VHOEs can be fabricated with a single layer element vs. the two adjacent VHOEs required for transmission composite lenses.

The reflection lens has distortion-free see-through functionality where light can pass from the backside of the HOE thorough the HOE since light is traveling at angles that do not satisfy the Bragg equation and are not diffracted. This functionality can be combined with an HOE that provides optical power to create an image combiner with capabilities can't be achieved using standard refractive or reflective optics.

Multi-Wavelength Reflection Mode Lens

The reflective lens can be extended to multiple wavelength system by using techniques to simultaneously record the holograms associated with each of the wavelengths during a single exposure as a diffraction pattern on a single recording media. This design will enable the reflective VHOE to combine multiple wavelengths in a way that can achieve the resolution equivalent to the single bandwidth lens described above. The design and fabrication process can also compensate for any decrease in DE by increasing $\Delta n$ and/or film thickness.

Figure 10:
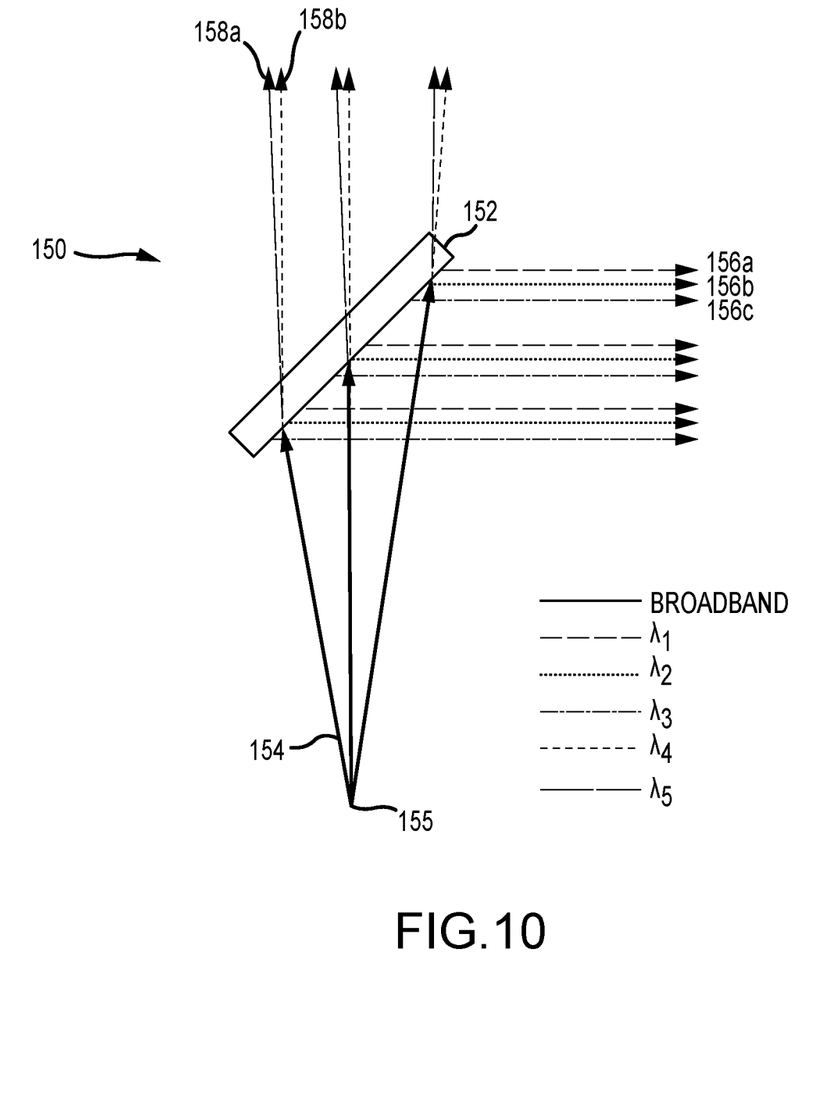
FIG. 10 is a diagram of an embodiment of a full color reflective mode VHOE.

As shown in FIG. 10, in an embodiment, a multi-wavelength reflection mode lens 150 comprises a plurality of diffraction gratings recorded on a holographic recording media 152 at each of the wavelengths. Divergent broadband light 154 is reflected from the VHOE at the angle of incidence for each of the wavelengths and bandwidths 156a, 156b and 156c and the single point source is projected to infinity. Light 158a and 158b at unwanted wavelengths is transmitted through the VHOE. Equivalently collimated broadband light is reflected off of the VHOE and brought to a common focus.

See-Through System with Reflective VHOE

Figure 11:
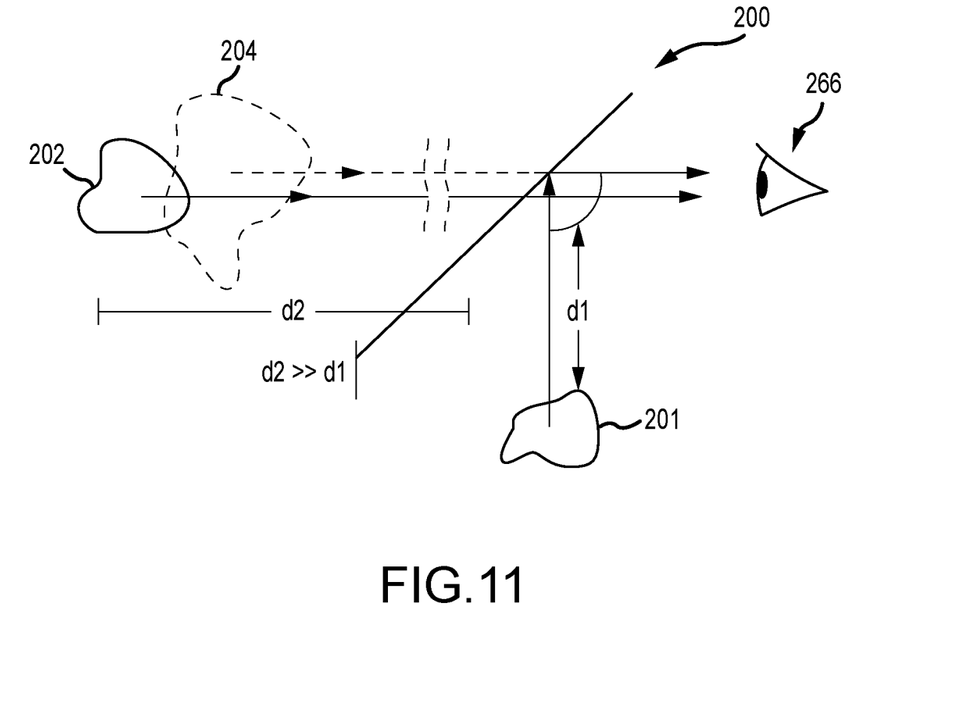
FIG. 11 is a diagram of an embodiment of a system implementation of the reflective mode VHOE in which an object is overlaid on a real scene.

As shown in FIG. 11, the see-through feature of a reflective VHOE 200 allows for the configuration of an optical system in which an image of an object 201 can be superimposed on a real scene 202 to present a virtual image 204 to an observer 206. The reflective VHOE 200 is configured with one or more diffraction gratings at different wavelengths tuned to the wavelengths emitted by object 201. Light from the object 201 is reflected from the VHOE 200 to the observer. Light at wavelengths outside the bandwidths centered about these wavelengths from real scene 202 passes through VHOE 200 to the observer.

The embodiment of the reflection VHOE capability to simultaneously provide both a see through capability for a broad spectrum of light as well as optical magnification from a second source for one or more narrow band wavelengths each with a separate bandwidth enables the development of low cost, light weight and low profile optical elements that can create optical systems that are not achievable with traditional refractive or reflection optics.

A particular embodiment that shows the advantages of the reflective VHOE 200 would be the ability to construct a simple optical system inside a car allowing the driver to see the content of his smartphone or other display (i.e. object 201) without having to adjust their focus from the far field (i.e. real scene 202).

In this example, the reflective VHOE is designed to take a diverging beam from a cell phone or other image source and project a magnified image of one or more colors with bandwidths to the far field of the driver's view. The transparent reflective VHOE 200 is attached to windshield or visor of a vehicle. An image source 201 projects a diverging image toward the reflective lens at a distance $d_1$. The reflective VHOE combines an enlarged image of driver's phone placed on dashboard with the scene of the road in front of the vehicle. One example would be the projection of a mobile phone image in such a way that driver would not have to shift his sight from the road nor refocus his eyes to see the phone content.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A transmission mode lens, a first composite lens (CL) comprising:

a first transmission mode volume holographic optical element (VHOE1) comprising a first recording media and a first diffraction pattern including a plurality of N interference patterns recorded on said first recording media at a plurality of N different recording angles rotated about a surface normal to the VHOE1 for N different wavelengths, respectively, in N different planes rotated relative to each other by the N different recording angles, said first diffraction pattern configured to receive broadband light on-axis along & the surface normal to the VHOE1 and deflect through transmission light at the N different wavelengths and non-overlapping bands at the N different recording angles to the surface normal to form N off-axis output beams that lie in the N different planes to separate the output beams and reduce cross-talk between the N different wavelengths; and a second transmission mode volume holographic optical element (VHOE2) comprising a second recording media and a second diffraction pattern including a plurality of N interference patterns recorded on said second recording media at the N different recording angles rotated about a surface normal to the VHOE2 for the N different wavelengths, respectively, in N different planes rotated relative to each other by the N different recording angles, said second diffraction pattern configured to accept the N off-axis output beams from the N different planes and to form through diffraction an on-axis output beam including the N different wavelengths and non-overlapping bandwidths to form an image,
wherein one of said first or second diffraction patterns provides optical power to magnify the light to form the image.

2. The transmission mode lens of claim 1, wherein said first CL exhibits diffraction efficiency (DE) of >75% over each of the non-overlapping bandwidths in a primary order along the axis at each said recording angle and suppresses light in unwanted diffraction orders to <1%.

3. The transmission mode lens of claim 2, wherein each of the non-overlapping bandwidths is at least 10 nm.

4. The transmission mode lens of claim 1, wherein said lens exhibits diffraction efficiency (DE) of >95% over each of the non-overlapping bandwidths in a primary order at said recording angle along the axis and suppresses light in unwanted diffraction orders to <0.1%.

5. The transmission mode lens of claim 4, wherein each of the non-overlapping bandwidths is at least 10 nm.

6. The transmission mode lens of claim 1, wherein the recording media of said first and second VHOE are in contact with each other and sandwiched between first and second substrates.

7. The transmission mode lens of claim 1, wherein the different recording angles are spaced at 360°/N such that the N different planes are rotated relative to each other by 360°/N.

8. The transmission mode lens of claim 1, wherein said first CL has a focal length $f_1$, further comprising a second CL having a focal length $f_2=f_1$, said first CL and said second CL spaced at a distance d of approximately 0.67*f where f the focal length of the transmission mode lens chosen so that the lens has the same focal length f at the minimum wavelength $\lambda_1$ and the maximum wavelength $\lambda_2$ of the bandwidth.

9. The transmission mode lens of claim 8, wherein said transmission mode lens exhibits diffraction efficiency (DE) of >75% over the wavelength range of at least 100 nm between the minimum wavelength λ1 and the maximum wavelength λ2.

10. A method of fabricating a transmission mode composite lens (CL), comprising:
interfering a first plurality of N collimated reference beams at N different recording angles rotated about a surface normal to a first recording media to lie in N different planes rotated relative to each other by the N different recording angles with a first plurality of N object beams parallel to the surface normal at N different wavelengths to record a first plurality of N interference patterns that define a first diffraction pattern on the first recording media to form a first transmission mode volume holographic grating (VHOE1), said first diffraction pattern configured to receive broadband light on-axis along the surface normal and deflect through transmission light at the plurality of N different wavelengths and non-overlapping bands at the N different recording angles to the surface normal to form N off-axis output beams that lie in the N different planes to separate the output beams and reduce cross-talk between the N different wavelengths; and
interfering a second plurality of N collimated reference beams at the at the N different recording angles rotated about a surface normal to a second recording media to lie in N different planes rotated relative to each other by the N different recording angles with a second plurality of N object beams parallel to the surface normal at the N different wavelengths to record a second plurality of N interference patterns that define a second diffraction pattern on the second recording media to form a second transmission mode VHOE2, said second diffraction pattern configured to accept the N off-axis output beams from the N different planes and to form through diffraction an on-axis output beam including the N different wavelengths and non-overlapping bandwidths to form an image,
wherein one of said first and second plurality of N object beams is collimated and the other is non-collimated and shaped so that one of said first or second diffraction patterns provides optical power to magnify the light to form the image.

11. The method of claim 10, wherein said transmission mode CL exhibits diffraction efficiency (DE) of >75% in a primary order along the axis over each of the non-overlapping bandwidths of at least 10 nm and suppresses light in unwanted diffraction orders to <1%.

12. The method of claim 10, in which the first recording media is affixed to a substrate and then exposed, the second recording media is affixed to the first recording media and then exposed, and a second substrate is affixed to the second recording media such that said first and second recording media are in contact with each other and sandwiched between the first and second substrates.

13. The method of claim 10, wherein the first plurality of N interference patterns are simultaneously written on the first recording media and the second plurality of N interference patterns are simultaneously written on the second recording media.

14. The method of claim 10, wherein said first CL has a focal length f1, further comprising:
fabricating a second CL having a focal length f2=f1; and
spacing said first CL and said second CL at a distance d of approximately 0.67*f to form a doublet lens where f the focal length of the doublet lens chosen so that the doublet lens has the same focal length f at the minimum wavelength λ1 and the maximum wavelength λ2 of the bandwidth.

15. The method of claim 10, wherein the N recording angles are spaced 360°/N such that the N different planes are rotated relative to each other by 360°/N.

16. A transmission mode lens, a first composite lens (CL) comprising:
a first transmission mode volume holographic optical element (VHOE1) comprising a first recording media and a first diffraction pattern including a plurality of N interference patterns recorded on said first recording media at a plurality of N different recording angles rotated about a surface normal to the VHOE for N different wavelengths, respectively, said first diffraction pattern configured to receive broadband light on-axis along the surface normal to the VHOE1 and deflect through transmission light at the N different wavelengths into N different planes rotated relative to each other by the N recording angles to separate N off-axis output beams to reduce cross-talk between the N different wavelengths; and
a second transmission mode volume holographic optical element (VHOE2) comprising a second recording media and a second diffraction pattern including a plurality of N interference patterns recorded on said second recording media at the plurality of N different recording angles rotated about a surface normal to the VHOE2 for the N different wavelengths, respectively, said second diffraction pattern configured to accept the N off-axis output beams from the N different planes and to form through diffraction an on-axis output beam to form an image, wherein one of said first or second diffraction patterns provides optical power to magnify the light in the bandwidth about the known wavelength to form the image.

\* \* \* \* \*